United States Patent [19]

Stone

[11] Patent Number: 4,593,406
[45] Date of Patent: Jun. 3, 1986

[54] AUTOMATIC IMAGE ACQUISITION PROCESSOR AND METHOD

[75] Inventor: William J. Stone, Kansas City, Mo.

[73] Assignee: The United States of America as represented by the United States Department of Energy, Washington, D.C.

[21] Appl. No.: 571,297

[22] Filed: Jan. 16, 1984

[51] Int. Cl.[4] ............................................. G06K 9/32
[52] U.S. Cl. .................................. 382/44; 250/491.1; 356/375; 358/101; 382/8; 382/45; 382/46
[58] Field of Search ...................... 382/44, 45, 46, 8, 6; 356/372, 373, 375, 399, 400, 401; 250/491.1; 358/101, 106, 107

[56] References Cited

U.S. PATENT DOCUMENTS

| | | | |
|---|---|---|---|
| 3,207,904 | 9/1965 | Heinz | 356/400 |
| 3,394,366 | 7/1968 | Dye | 340/707 |
| 3,903,363 | 9/1975 | Montone et al. | 358/101 |
| 4,057,347 | 11/1977 | Moriyama et al. | 356/401 |
| 4,070,117 | 1/1978 | Johannsmeir et al. | 356/401 |
| 4,160,262 | 7/1979 | Christy et al. | 358/101 |
| 4,167,677 | 9/1979 | Suzki | 356/401 |
| 4,203,132 | 5/1980 | Schmitt et al. | 358/101 |
| 4,212,031 | 7/1980 | Schmitt et al. | 358/101 |
| 4,233,625 | 11/1980 | Altman | 358/101 |
| 4,253,112 | 2/1981 | Doemens | 358/101 |
| 4,319,272 | 3/1982 | Henry | 358/101 |
| 4,453,266 | 6/1984 | Bacus | 382/6 |

*Primary Examiner*—Leo H. Boudreau
*Assistant Examiner*—Joseph Mancuso
*Attorney, Agent, or Firm*—George H. Libman; Albert Sopp; Judson R. Hightower

[57] ABSTRACT

A computerized method and point location system apparatus is disclosed for ascertaining the center of a primitive or fundamental object whose shape and approximate location are known. The technique involves obtaining an image of the object, selecting a trial center, and generating a locus of points having a predetermined relationship with the center. Such a locus of points could include a circle. The number of points overlying the object in each quadrant is obtained and the counts of these points per quadrant are compared. From this comparison, error signals are provided to adjust the relative location of the trial center. This is repeated until the trial center overlies the geometric center within the predefined accuracy limits.

17 Claims, 4 Drawing Figures

AUTOMATIC IMAGE ACQUISITION PROCESSOR AND METHOD

The U.S. Government has rights in this invention pursuant to Contract No. DE-AC04-76DP00613 between the Department of Energy and Bendix Corporation.

FIELD OF THE INVENTION

The present invention relates to automatic image analysis and in particular relates to a point location system for ascertaining locations and alignments of articles, such as small, precision-plated elements.

BACKGROUND OF THE INVENTION

Thin film devices are often developed and manufactured in large arrays which are created in a batch process. Such arrays of thin film devices generally have rigorous specifications on the size, shape, location, orientation and register in the individual devices and in their ultimate assemblies. The mensurating tasks of point location, codification, data reduction and recording of such inspections can be formidable unless the inspection strategy includes some form of automatic image analysis.

In the case of miniature elements, this instrumentation takes the form of a microscope/closed circuit television module which is pointed and interpreted by a computerized positioning device. Like a military fire control system, this instrumentation must acquire its target and move the system such that the target image is centered to its field of view. Unlike the military fire control system, the nominal location of these targets is designed into their manufacture. Thus, the sophistication and complexity normally required for fire control system image analysis is not needed for these targets.

Many complex and sophisticated systems for pointing, tracking, homing, intercepting and navigation guidance are in existence and use in ordinance, satellite and astronomical disciplines. The cost and sophistication of these systems, however, appear to be an overkill for the problem of positioning a known shape identified within a known field of view. Such classical tracking systems perform many familiar tasks. Including the aforementioned fire control tasks, there are also missile trackers, target trackers, and missile guidance. From navigation and astronomy there are star trackers and horizon sensors. From robotics, there are photomask registerers, tracking theodolites, and many pointing microscopes.

These pointing strategies use a variety of physical phenomena to accomplish their error sensing task in a known media. All sense, interpret, and react. Some use inherent target radiation (passive systems); others are active in that they supply the media. Target shape, range, range rates, angular rate, size, color, spatial, and time frequency are but a few of the parameters that are used successfully to automatically discriminate and lock-on a given target. In optical-mechanical-electronic systems, there must be viewing systems, scanning systems, interpretation processors, error signal generators, and servo systems to accomplish the pointing and, finally, feed-back systems to monitor the success of the tracking. These feed-back systems detect the end point of the operation and "shoot the gun" or initiate some kind of response.

Tracking systems are normally classified by whether they scan the image plane or the object plane; whether they are simple scanners, stationary mosaics, and/or nonreticle or reticle devices. Such various and extensive classification procedures and systems are mentioned only to indicate the massive amount of literature that is available for such problems. For example, one source for additional information is the bibliography of "Advanced Infrared Technology", the text for the University of Michigan Engineering Summer Conferences, June, 1965.

The scanning techniques used in the various tracking systems often depend upon the complexity of the particular system. However, in the field of the present device, a relatively known simple search pattern should be possible because most of the targets are essentially primitive shapes and the optical contrast between and within them and their background is optimum, and in fact is essentially perfect. Well known simple search patterns include the spiral of Archimedes, rosettes, and raster scans. However, such "simple search patterns" still appear to be overly sophisticated for the field of the present invention, particularly where the approximate location and orientation, as well as the shape, of the object to be located is known. In addition, the uniformity and relatively primitive shapes of some product targets, such as those in the advanced ignition system field suggest that the target pattern recognition and lock-on mechanism can be of the most simple design. In short, most conventional target acquisition processors are too sophisticated for the present problem.

There was also found to be a need for a simple optical pointing system in the field of exploding bridge elements which are commonly used to activate flyer plates in laboratory instrumentation that is used for spalling, equation of state, and other investigations involving impact transfers of high energy intensity. The mensuration of such planar objects by profile projection and subsequent automatic image analysis demonstrated a need for a simple optical pointing system.

Previous techniques for inspecting large arrays of precision elements are known. Such techniques include systems for manual positioning and visual inspection by hourly inspectors. The obvious enormity of attempting a nonautomated visual "one-on-one" inspection of these components in vast arrays with manual positioning has also been documented. These documents discuss the required precision and methodology of the techniques but the implicit inspection-time per assembly and operator fatigue demonstrate a need for an automatic image analysis approach. For example, thirteen replications per element are required in one case in order to achieve the required precision for point location. The operator must peer into a microscope to perform optical nulls on the elements and must maintain a rigorous attention span of about 2 to 3 hours per part.

Current practice provides for the nonautomated visual inspection of many such arrays for mensurations and surface flaw detection. Obviously, this practice is also time-intensive, tedious, subjective, and prone to operator-fatigue errors. The need for such visual evaluation by an automatic system is apparent.

With respect to advanced ignition systems, the product consists of precision thin-film patterns deposited on dielectric substrata and may be manufactured in the form of large arrays of individually critical components. This multitude of precision elements must be inspected for location, orientation, size and shape, both as individuals within the array and as groups with respect to their registration with other arrays in the final assembly. The number of individual inspections and the required accuracy of the determinations also demonstate a need for an automatic image analysis as the most prudent approach.

The repeatability of modern photolithography techniques is such that nominal pointing of an automatic image analysis system will result in positioning a subject element on center with the system's TV image field-of-view to within plus or minus 0.1 mm. However, timing specifications require at least five times that positional accuracy and integrity.

To achieve the required precision of location data, the nominal pointed target must be acquired, its pattern must be recognized, and it must be oriented and moved to the center of the pointing microscope's field-of-view before further mensurations or location algorithms can be employed. The problem may thus be defined as the acquisition of the capability to: point the microscope at the nominal element location; acquire the target image; orient the target or the microscope; and translate the target or the microscope to the center of the pointing system's optical axis. When pointing to the nominal position of the target, the task further becomes one of measuring the target's deviation from its nominal position and moving the target or the optical field of view to the optimum measurable position. Normally with the current accuracy of present day manufacturing processes, the target usually falls into a random location and orientation within the field of view of the optical instrumentation upon a nominal pointing. However, as mentioned above, such accuracy is still not within the accuracy required for the inspection and mensuration of minature elements. It is the need for the further positioning in an automatic method and using automatic apparatus that served as the background for the present invention.

Numerous United States patents discuss the above mentioned overall problems and include the following: Doemens No. 4,253,112; Altman No. 4,233,625; Schmitt et al No. 4,212,031; Schmitt et al No. 4,203,132; Suzki No. 4,167,677; Christy et al No. 4,160,263; Johannsmeier No. 4,070,117; Moriyama et al No. 4,057,347; Dye No. 3,394,366; and Heinz No. 3,207,904.

The Doemens patent is directed to the alignment of a semiconductor wafer and a mask for subsequent processing in which the alignment is accomplished by creating error signals from a difference in the analog sequential signals generated by two contemporaneous single scans. Fiducial patterns are located on both the mask and the wafer.

The Altman patent discloses a system for aligning successive, small, identical, rectangular grid patterns according to a previously selected position and orientation. It is a position duplicator for nearly identical patterns.

The two Schmitt patents are concerned with aligning a body to a preselected coordinate system and the alignment or register between two elements. A closed circuit television with variable magnification is utilized to obtain images of the body. A found feature in the image of the body is digitized and stored as a binary record. The body is then positioned into the desired alignment by servos operating on generated error signals.

The Suzki patent discloses an optical device for aligning semiconductor wafers and masks for successive production operations. The alignment is accomplished by using fiducial marks on both components. An algorithm converts nonsymmetrical signals from a single linear scan of the superimposed images of the fiducial marks into error signals for translation. The algorithm also converts other data from a separate area of the images into error signals for rotation.

The Christy patent discloses a video microscope with multiple objective lenses that can project superimposed images from two or more fields of view.

The Johannsmeier et al patent discloses an apparatus for the alignment of masks and the work in photolithography. A split image for the preselected pattern is sampled through "peek-a-boo" slits and error signals are generated based on the registration of the fiducials.

The Moriyama patent discloses apparatus for minimizing registration errors between a work table and a photomaster table in photographic exposures. The apparatus utilizes a feedback signal generated by the difference between the commanded position of the table and the actual position of the table.

The Dye patent discloses a data display system in which an image is digitized and stored in the memory of a computer, with the image being rearranged via a manually operated light pen.

Finally, the Heinz patent discloses a system for electro-optically positioning articles through translation and orientation. The total light from a quadrant is integrated and then compared with the light from other quadrants with the system attempting to equalize the light per quadrant.

SUMMARY OF THE INVENTION

There is a need for a simplistic and inexpensive target acquisition and target centering method and apparatus usable with elements having a known pattern and situated at an approximately known location. The present invention essentially relates to a target acquisition system for use in a larger point location system containing an assembly of instrumentation used for inspecting precision plated components such as advanced ignition system components.

The present invention was created from a need to implement a strategy of communicating with a light image, such as one on a television, acquiring a target on the image and rotating and translating the image and/or the target until the optical center is found. The present invention satisfies that strategy and provides a method and apparatus in which the product design can be fixed, and in which the inspection technique does not require an alteration of the physical design to any significant cost, time or functional requirements. The present invention operates on both rectilinear and circular patterns, usually of the primitive types of shapes. The image can be aligned to within plus or minus 0.025 mm in the x and y directions and can be oriented to within plus or minus 5 degrees.

In a particular embodiment of the present invention, the target acquisition processor is basically a tracking system having the same basic functions as gun pointing systems used in fire control, but with the added degrees of freedom of target manipulation. Furthermore, the shape and approximate location of the target is known. The present invention can employ a single scanner having a one-to-one simple correspondence to the position that provides an unambiguous pointing advantage. The mechanics of the system's search and pattern recognition require only a simple scan pattern and relatively uncomplicated and simplistic pattern recognition schemes so long as the targets are essentially primitive shapes and the optical contrast between the target and the background is optically distinct.

The present invention preferably employs in a preferred embodiment the software control of a general purpose computer. The present invention is particularly addressed to the target acquisition and centering strategy. Such a strategy permits the incorporation of conventional components and levies no requirements for a substantial change in the fixed design of the element. Adequate precision is achieved to certify the position of the element and the registration of array assemblies.

It is therefore an object of the present invention to order the fine translations and rotations of a pointing optical system for positioning an image having a primitive shape at its optimum mensuration location and orientation in the field of view of the optical system. A primitive shape, in the context of the present invention, means having a shape of one of the primitive geometric objects, such as a circle, triangle, rectangle, or a combination of those objects.

In one embodiment, the method of the present invention relates to determining the geometric center of an element having a known peripheral shape. The method includes selecting a trial center of an image of the element and defining a plurality of sectors radiating from that center and encompassing all of at least a preselected portion of the element image. Then, a determination is made of which ones of a locus of spaced points, along a line that runs through all of the sectors and has a predetermined relationship to the trial center, overlie the element image. A comparison is then made of the number of points that overlie the image in each sector with the number of points overlying the image in each of the other sectors. If that comparison is the same as a predefined comparison that exists when the trial center is located at the geometric center of the element, then the geometric center has been located to within the desired accuracy. If the comparison is not the same, then the trial center is moved based on the comparison and the selecting, determining, comparing and ascertaining steps are repeated.

In another aspect of the present invention, the present invention is directed to apparatus for determining the geometric center of an element having a known peripheral shape. The apparatus comprises means for obtaining a visual image of the element and a means for digitizing at least selectable, predetermined portions of that image. The apparatus further includes means for moving either the element or the image obtaining means or both relative to one another, a means for selecting a trial center of the visual image and for defining a plurality of sectors radiating from the trial center and means for determining the value of digitized portions of the visual image, those portions lying along a locus of points running through the plurality of sectors and having a predetermined relationship to the trial center. A comparison means then compares the value of the digitized portions in one sector with the value in each of the other sectors and causes the moving means to reposition either one or both of the element and the image obtaining means in response to that comparison.

Other advantages and objects of the present invention will be set forth in or apparent from the description of the preferred embodiments thereof contained hereinbelow.

DESCRIPTION OF THE PREFERRED EMBODIMENTS

Figure 1:
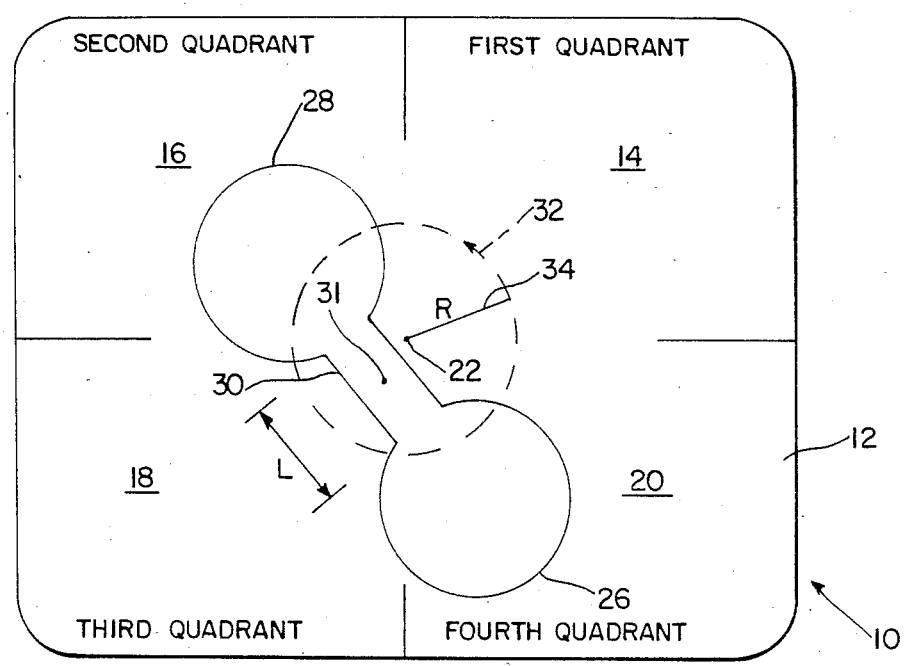
FIG. 1 is a schematic representation of a combined primitive shape located within a field of vision for the purposes of explaining the present invention.

With reference now to the figures wherein like elements or components are denoted by like numerals throughout the several views, an automatic image acquisition processor and method for ordering the fine translations and rotations of a pointing optical system and for positioning a rectlinear image at its optimum mensuration location and orientation is depicted. In particular, with reference to FIG. 1, a TV screen 10 encompasses a field of view 12 that is divided into four quadrants, a first quadrant 14, a second quadrant 16, a third quadrant 18 and a fourth quadrant 20, the quadrants emanating from a center 22 of the field of view 12. Center 22 is a trial center based on the positioning of the TV screen. The TV screen 10 displays the image 24 of an element in the shape of a dumbbell. The dumbbell image consists of three primitive shapes, two circles 26 and 28 joined by a rectangle 30. It is thus apparent that the image 24 of the element has a two dimensional dual symmetry and that the geometric center of rectangle 30, denoted 31, is also the geometric center of the entire element. Rectangle 30 has a length "L" as depicted in FIG. 1.

For the purposes of explanation, consider TV screen 10 as being a planchette whose center is also located at center 22. Located on the planchette is the outline of a circle denoted 32 having a radius "R" denoted 34. The length of radius 34 is critical to the precision of the invention. In the example of a dumbbell element, the radius should be about 10 percent greater than the square root of two times the length "L" of rectangle 30 (i.e., $R = 1.1 \times 2^{\frac{1}{2}} \times L$). The criteria for determining the optimum lengths of the radius "R" is based on the length of a hypotenuse of a square which side equals the length "L" of rectangle 30. The 10 percent increase in radius "R" is based on a subjective criteria for obtaining a sufficient overlap of rectangle 30 so as to also encompass a minimum sufficient part of circles 26 and 28.

The object is to locate the planchette over the image 24 of the dumbbell so that trial center 22 is located over the rectangle center 31. It should be obvious that an alternative method is to rotate and position the image 24 of the dumbbell so that its center 31 is located superimposed on trial center 22. Essentially then, circle 32 must be reoriented relative to image 24 so as to angularly and translationally align the two centers. This is done by selecting angular divisions along circle 32 and ascertaining whether at each angular division that point overlies, is over or is superimposed on a part of image 24 or the background area. This is done at the selected angular divisions for each quadrant. The angular size of the divisions along circle 32 is preferably selected based on the maximum definition capability of TV screen 10. Using the dimensions of the example depicted in FIG. 1, and for a TV screen 10 that is comprised of a matrix of pixels having a dimension of 512 by 512, there is approximately one pixel per degree along the circumference of circle 32. Thus, the size of the angular divisions in this specific example would be one degree.

Again referring to the specific example depicted in FIG. 1, it can be seen that the summation of overlaid pixels for the first quadrant and thus the count would be zero since the circumference of circle 32 does not pass through any part of image 24. The count for the second quadrant would be approximately 76 because the locus of points defining circle 32 overlies image 24 for approximately 76 degrees. Similarly, in the third quadrant, the count would be approximately 18 since the locus of points defining the circumference of circle 32 overlies approximately 12 degrees within circle 28 and overlies approximately 6 degrees within circle 26. Finally, for a similar reason, the count in the fourth quadrant is approximately 56. Again, this is assuming that there is one pixel per degree. Obviously, the counts would be different if there were a greater number of pixels per unit of circumference of circle 32.

It should thus be apparent that in order to superimpose center 22 over center 31 of image 24, either image 24 or center 22 must be translated. For the present example only, assuming that center 22 remains fixed, image 24 must be translated upwardly or in the plus Y direction, and to the right or in the plus X direction. In addition, in order to align image 24 along the vertical Y-axis, image 24 must also be rotated in the clockwise direction.

The particular mathematical algorithms to determine the relative rotations and translations will vary with the particular image outline and the selected locus of points. For the present example, using an element having an dumbbell outline as depicted in FIG. 1 and using a circular locus of points, the particular mathematical algorithm is depicted in FIG. 3, which will be described hereinbelow. However, for the purposes of that algorithm, and using the notation depicted in FIG. 3, the results of the counts from the particular orientation of image 24 on TV screen 10 yields the following values:

$Q_1 = 0$
$Q_2 = 76$
$Q_3 = 18$
$Q_4 = 56$

In the above example it has been assumed that the digitized image produces a "1" when the locus of the circle circumference overlies the image and a zero when it does not. However, it should be obvious that the reverse could be used. It should also be obvious that other loci of points can be used. For example, a cruciform can be used when the image does not have to be rotated (e.g., where the image is a circle or a circular hole). Other loci of points that can be used include a series of petals or rosettes radiating symmetrically from the center. In the case of a circular locus of points, the center is obviously circumscribed. To simplify the movement algorithm, the locus of points should be symmetrical about the center and should transverse the same number of pixels per sector. Also, in the example depicted in FIG. 1, four quadrants were used. It should be obvious, however, that a greater number of sectors could be used or even a lesser number of quadrants could be used, depending upon the shape of the image to be centered. In all cases, the count is made only of the pixels traversed by the locus of points and the overall shape outside or inside the locus of points is disregarded.

Figure 2:
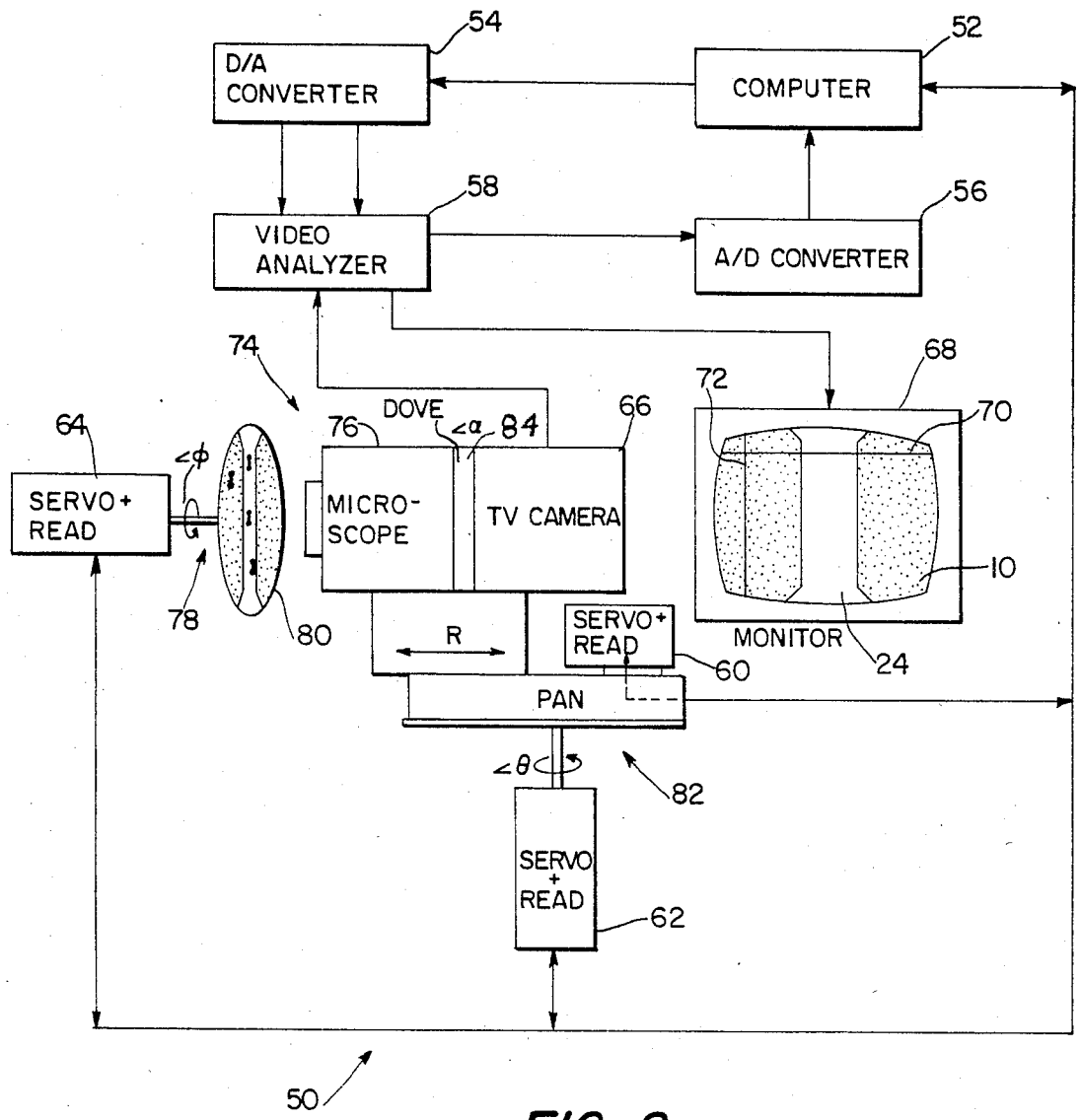
FIG. 2 is an electrical schematic diagram of apparatus employed by the present invention and forming a part thereof.

With reference now to FIG. 2, a schematic block diagram of a target acquistion processor 50 is depicted. Processor 50 includes a programmed, general purpose digital computer 52 connected through a digital-to-analog converter 54 and an analog-to-digital converter 56 to a video analyzer 58. Computer 52 is also connected to control and to receive information from a plurality of servosystems, an R servosystem 60, a Theta servosystem 62, and a Phi servosystem 64, to be described hereinbelow.

Computer 52, as mentioned above, can be any general purpose digital computer having the sufficient storage and data handling capabilities for the particular system. One such computer can be a Digital Equipment Corporation PDP 11/05 minicomputer. Similarly, digital-to-analog converter 54 and analog-to-digital converter 56 can be any conventional, commercially available equipment such as a Hewlett-Packard Controller Model 6936A Multiprogrammer.

Video analyzer 58 receives a signal from a TV camera 66 and produces an output to a conventional, raster scanned TV monitor 68 and to analog-to-digital converter 56. Converter 56 determines the threshhold voltage at which a video signal is said to exist or not to exist at a given point. This threshhold voltage can either be manually set or can be determined through a conventional computer program by computer 52. Such a computer program essentially evaluates all or selected parts of the video image for contrasts and determines the optimum threshhold voltage so that all gray points will be classified as either a white point or a black point.

Video analyzer 58 has the function of inserting and manipulating an X cursor 70 and a Y cursor 72 superimposed on video monitor 68. Video analyzer 58 thus is used to digitize the raster scan of TV monitor 68 into an array of points. In the present embodiment, this is a 512 by 512 square matrix which thus contains 262,144 points. Conventionally, such points are called pixels. In the present embodiment, video analyzer 58 can be a conventional product manufactured by Colorado Video. As would be apparent to those skilled in the art, obvious modifications to video analyzer 58, converters 54 and 56, and TV camera 66 are possible. For example, TV camera 66 can be a conventional digital TV camera which has a self triggering, automatic scan and video analyzer can be conventional equipment which determines at what particular time a given digital pixel is being read by camera 66 and being supplied by it. Furthermore, in some conventional digital TV cameras, the threshhold voltage is automatically applied and the decision made by circuitry within the camera itself.

Processor 50 is also comprised of a pointing system 74. Pointing system 74 is comprised of a microscope 76, a specimen holder 78 holding a specimen 80 and servo-controlled rotational mounting table 82. Microscope 76 can be a conventional Zeiss EPI-Plan microscope and table 82 is preferably an inductosyn table such as an ULTRON table manufactured by AA Gage Inc. Microscope 76 is equipped with a dove prism 84 image rotator. Table 82 can be rotated in the Theta angular direction by servosystem 62 and can be translated in the "R" direction by servosystem 60. Specimen holder 78 can be rotated by servosystem 60 about an angle Phi and dove prism 81 can rotate the image about an angle Alpha. Preferably, specimen holder 78 and table 82 can be rotated with a precision of plus or minus three tenths of an arc second.

Preferably, microscope 76 produces a microscopic image having a magnification of 100×. This image is then monitored by TV 66 and produced as image 24 on TV screen 10 of video monitor 68.

With this basic instrumentation, processor 50 can automatically point at the center of a precision element and record its position with respect to the spherical coordinate system (Theta, Phi, R) to within a projected plane error of less than 0.001 mm.

In order to obtain a proper target image, there are certain constraints on specimen 80. Specimen 80 must provide an optical contrast for the entire microscope field of view with a calculatable threshhold that will provide attribute sampling (i.e., all pixels counted are either white or black). The edges of the components of specimen 80 must be readily recognizable as a sequential change from white to black, black to white, white to black, and finally black to white. A model of an appropriate specimen that was constructed of opaque PVD aluminum plated on a kapton, dielectric substrate in thin film patterns up to 1.5 mm in their longest linear dimension could be conveniently viewed by and accurately imaged with pointing system 74. Such specimen produced an image that could be focussed with adequate brightness and contrast and optically adjusted to yield a uniformly dark shadow on a uniformly bright brightfield.

In operation, computer 52 directs video analyzer 58 to move cursors 70 and 72 about a predefined locus of points on TV screen 10 and to read the brightness at predetermined intervals about that predetermined locus of points. In the present example, the locus of points is the circumference of a circle. Computer 52 establishes a threshhold for discriminating between black and white pixels during the sampling and records the number of white pixels encountered in each quadrant. As described in greater detail hereinbelow, the relationships between the counts in the various quadrants are used to calculate the desired X and Y translations and the required rotations to center the image. These movements are made proportionate to known displacement parameters through a series of iterations or repetitions of the procedure, and the image is moved in steps to the desired optimum position and orientation.

Servosystems 60, 62 and 64 are commanded to step the specimen 80 or microscope 76 until the count is equal in all of the quadrants within predetermined limits. Such predetermined limits can simply be the difference RMS value of the four quadrant counts based on the differences from the average. The present invention is capable of target recognition and alignment in less than 4 minutes per target, including those targets having rough boundaries or edges. The precision produced within that time period is better than 0.0002 degrees of arc for angles Phi and Theta and less than 0.5 degrees of arc in angle Alpha, the orientation angular error. Stated another way, the point location system of the present invention using the aforedescribed technique can point at the nominal location of the center of the specimen image to within plus or minus 0.001 mm in the X or Y directions and to within plus or minus 0.5 degrees arc of orientation. Should this precision still be inadequate, the precision can be increased several times by simply providing and counting more pixels per quadrant.

The computer program which can be employed by computer 52 for determining the present location and orientation of the image and for providing adjustment commands to center the image is shown in flowchart form in FIG. 3. Furthermore, a FORTRAN IV language computer program for an older embodiment of this invention is set forth in the Appendix. Essentially, the computer program of the present invention obtains the quadrant totals for the counted white pixels along the generated locus of points in the circular scan and then equalizes the counts by commanding the necessary rotations and translations to center the TV raster and the image. With reference now to FIGS. 3, the flowchart of an appropriate computer program for centering a dumbbell shaped image using a locus of points in a circular pattern is depicted. The program begins at start oval 102 in which various housekeeping functions are performed. These housekeeping functions initialize all registers and make system component checks to determine that the system is ready and functional. The specific computer commands would depend upon the particular system and, in any event, would be obvious to those skilled in the art. The program proceeds next to box 104 where the arrays and variables are dimensioned. From box 104, the program determines in a conventional manner the threshhold voltage TH to be used. For example, the subroutines of box 106 could cause a sweep of the image to be made and samples of the field taken at preselected locations. The distribution of voltages indicating brightness and the distribution of voltages indicating darkness can be taken and averaged in order to minimize overlap.

From box 106, the program proceeds to process box 108. The steps performed in process box 108 include directing the movement of cursor 70 and 72 into a circular locus of points and the reading of the voltage values at preselected points along the circle. The convention used by the computer program counts all light points per quadrant and sums up the totals. A light point is defined under this convention as being superimposed on or overlying the image. For example, the intersection of cursor 70 and 72 depicted in FIG. 2 would produce a "0" because they do not overlie image 24. Then the totals of the number of light points of each quadrant are obtained and stored as $Q_1$ (quadrant one), $Q_2$ (quadrant two), $Q_3$ (quadrant three) and $Q_4$ (quadrant four).

The program next proceeds to a decision diamond 110 in which the sum of the counts for quadrant one ($Q_1$) and for quadrant two ($Q_2$) are compared with the sum of the counts for quadrant three ($Q_3$) and quadrant four ($Q_4$). If the comparison shows a positive value indicating that $Q_1+Q_2$ is greater than $Q_3+Q_4$, then the program moves to box 112. Should the comparison produce a negative value, the program moves to box 114. In the former case, a signal is generated by the computer in box 112 to cause a relative movement of the image in the negative "Y" direction. In the latter case, the signal generated by the computer in box 114 results in a movement of the image in the positive Y direction. Should the sum of the counts be equal, then the program proceeds to decision diamond 116 where the sum of the counts in the first and fourth quadrant is compared with the sum of the counts in the second and third quadrants. Should the comparison be positive, the program moves to box 118 which causes a movement of the image in the positive X direction. Alternatively, if the comparison is negative, the program moves to box 119 which generates a command for relative movement of the image in the negative X direction. An equal comparison in decision diamond 116 circumvents both boxes 118 and 119 and proceeds to decision diamond 120 in FIG. 3b.

In the example depicted in FIG. 1, with the quadrant counts set forth above, decision diamond 110 would indicate that $Q_1$ plus $Q_2$ equalled 76 and that $Q_3$ plus $Q_4$ equalled 74. Thus, the program would move to box 112.

Similarly, decision diamond 116 would show that the comparison is negative and thus the program would proceed to box 119 causing a negative X movement of the image. It should be noted that because of the optics involved in FIG. 2, the image is inverted and thus a negative Y and a negative X movement results in image 24 moving closer to center 22 (FIG. 1).

Figure 3A:
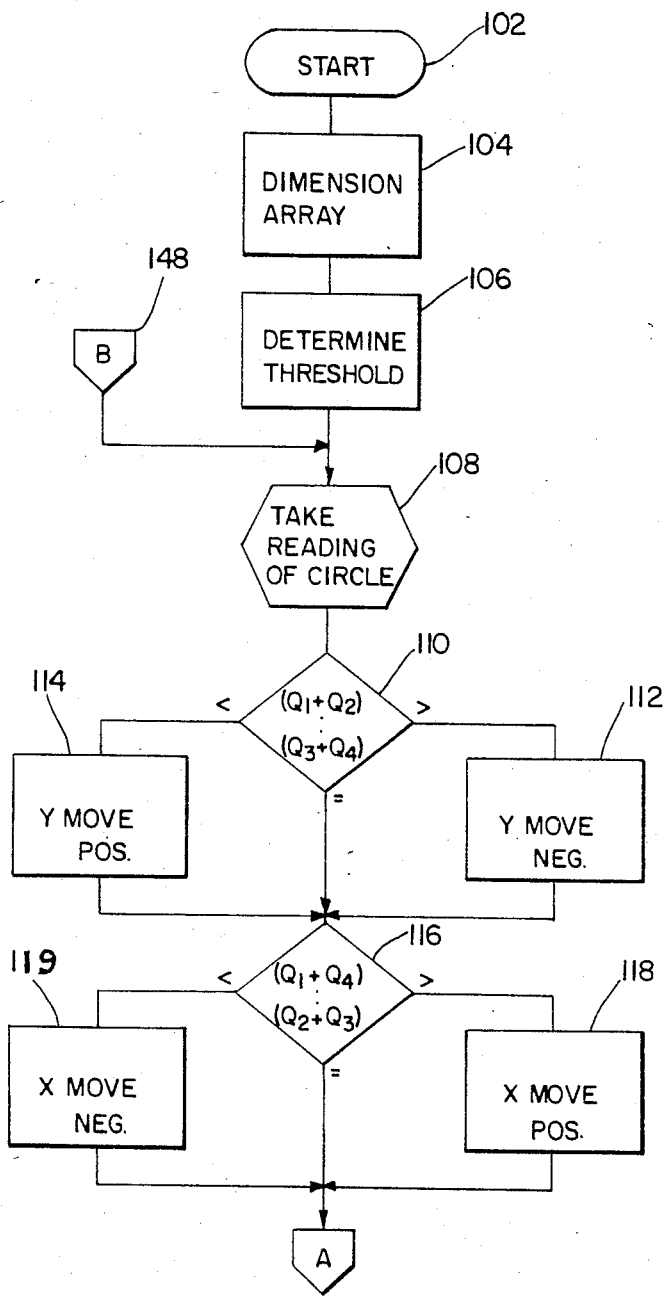
FIGS. 3a and 3b are a schematic flowchart of a computer program of one embodiment of the present invention.
Figure 3B:
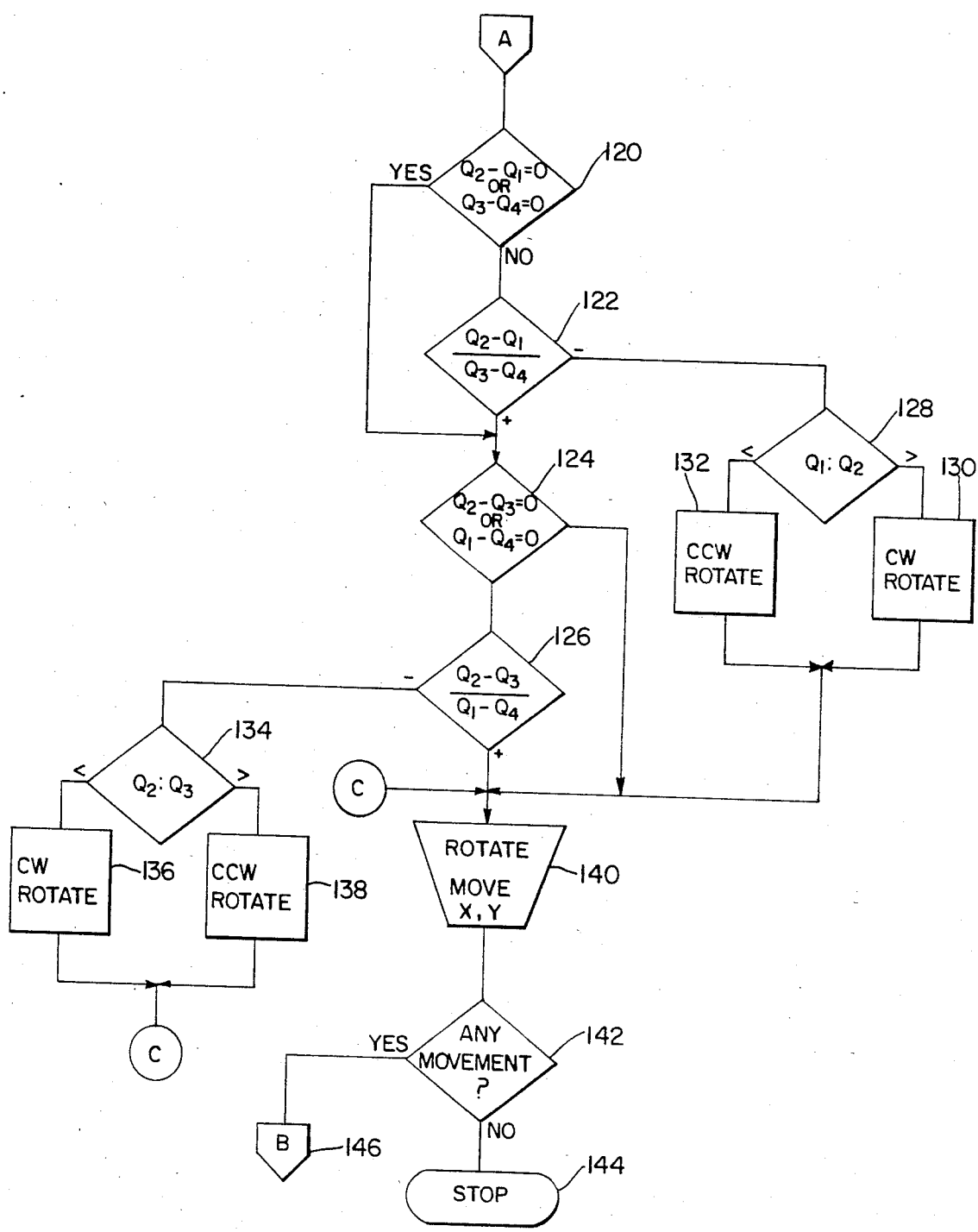

The necessity for rotational movements of the translated image is decided in decision diamonds 120, 122, 124 and 126 (see FIG. 3b). A first stage of rotation is determined in decision diamond 122 which calculates the ratio of the differences between the counts in the second and first quadrants to the difference of the counts in the third and fourth quadrants. Decision diamond 120 determines whether the first stage rotation is necessary and also prevents a division by zero in decision diamond 122. If the ratio in diamond 122 is negative, then the program proceeds to decision diamond 128 which compares the counts in quadrants one and two to ascertain whether the rotation will be clockwise or counterclockwise. The determined rotation of clockwise or counterclockwise is performed as a result of commands generated in boxes 130 and 132, respectively. Decision diamond 126 calculates the ratio of the differences between the counts in the second and third quadrants and the counts in the first and fourth quadrants. Decision diamond 124 performs the same function for decision diamond 126 as decision diamond 120 performs for decision diamond 122. Should the result of decision diamond 126 be negative, then a comparison of the counts between quadrants two and three is made in decision diamond 134. A negative comparison causes a clockwise rotation as a result of signals generated in box 136 and a positive comparison determines a counterclockwise rotation as a result of signals generated by box 138.

To continue the example depicted in FIG. 1 using the above determined values, the ratio of the differences between Q2 and Q1, and Q3 and Q4 produces a negative value. Because Q1 is less than Q2, the computer program will proceed to box 132, which will generate signals to produce a counterclockwise rotation.

Operation box 140 monitors the performance by the various servos of the generated commands and further generates a hard copy printout of those commands and of the values of Theta, Phi and R. The program then proceeds to decision box 142 where the accuracy criteria are examined and a decision is made as to whether a further iteration of the process should be made. If no such iteration is made, the program proceeds to STOP terminal 144. If further movement is indicated, then the program proceeds through connector 146 in FIG. 3b to connector 148 in FIG. 3a.

It should be noted that although the calculations performed by the computer program result in translational and rotational commands, these commands must be first transformed to the particular coordinate system of the pointing system. For pointing system 78 (FIG. 2), this is a spherical coordinate system. Thus even the translational commands must be transformed into spherical coordinate commands (see e.g., Appendix A after line 10).

In essence, the flowchart depicted in FIG. 3 fixes the specimen array in a known position and orientation on the mapping machine coordinate system. It then points the microscope system to a nominal location of the first target object in the specimen array. The computer program algorithm is then performed to obtain good orientation and alignment having a course accuracy in order to permit a precise focusing (i.e., a translational adjustment by servosystem 60). The algorithm is performed again to obtain a precision location of the image at which time the actual coordinates of Theta, Phi and radius are taken.

As mentioned above, the Appendix depicts one implementation of the flowchart depicted in FIG. 3. This implementation utilizes a number of subroutines which are not important to the present invention. For the sake of completeness, however, these subroutines will be briefly identified. The subroutine "motor" commands the appropriate servo motor of the servosystem. The subroutines "TBINN" and "TBLOUT" provide communications between computer 52 and table 82 and specimen holder 78 and reads the information or provides commands to table 82 and specimen holder 78, respectively. The subroutine "START" provides an initialization program that turns on the various motors and performs status checks on them. The subroutine "INISHL" initializes the system in general and puts the equipment in a known starting position and zeros certain registers. The threshhold sampling and calculation is performed by the subroutine "VIDCAL". This subroutine operates video analyzer 58 (FIG. 2) and thus is dependent on its hardware. Finally, the "CLOSE" subroutine does a number of housekeeping items such as printing out all of the data obtained and the positions of the various components.

A point location system has been described hereinabove which presents a simple strategy for acquiring a subject element and centering the subject element within a field of view. A pointing microscope provides an image on a closed circuit television and a video analyzer generates and moves a set of orthogonal cursors along a predefined locus of points having a predetermined relationship with the center of the field of vision. At various, predetermined points along the locus of points, the image underlying the intersection of the cursors is determined and digitized. The number of such pixels encountered by the cursor intersection along the locus of points which overlie the image in each of the quadrants is then counted and the counts compared to determine and to generate appropriate rotational and translational changes in the relative positions until all of the counts are equalized.

The computer program shown in flowchart form in FIG. 3a and FIG. 3b has translational preference since those moves are done first. However, such a program could have rotational preference, which in some circumstances (i.e., types of specimens and loci of points) is more advantageous. Furthermore, the algorithm using the counts per quadrant can be independent of the particular loci of points used. Obviously, different loci of points will have different advantages and disadvantages in accuracy and required number of iterations depending upon the shape of the specimen being analyzed.

While a dumbbell shape having a rectilinear midsection was utilized in the present example, it should be obvious to those skilled in the art that other image shapes can be used. Furthermore, other loci can be used, and other apparatus for digitizing the image can be used. Other modifications which would be apparent to those skilled in the art from the above disclosure of the present invention are also within the scope of the present invention.

APPENDIX A

```
C       NAME OUIAUT.FOR
        COMMON/CAL/XC(2,7,14),YC(2,7,14),BC(2,7,14),
       * JX(10),JY(10),IX,IY,CGI,X(10),YX(10)
        COMMON/CTV/XZ,YZ,BZ,RO,TH,BR,PY,A1,A2,A3,
        N1,N2,N3,COV,RES,
       * EX(4),EY(4),AN(3,30),IBFLG
        COMMON /EDG/ XE(2,20),YE(2,20),NE,IFLG
        COMMON/WRK/NW(3,30),NT(30),XW(30),YW(30),
        BW(30)
        DIMENSION IQ(4),WINDOW(360)
        DIMENSION NEG(2),SIG(2),END(2),ND(2),YP(3),
        WID(100)
        REAL*8 TV,FOCSLP
        INTEGER PARMS(7)
        BYTE RESP,BELL
        EQUIVALENCE (ROTATE,PARMS(6))
        DATA TV/12RSY TV SAV/,FOCSLP/12RSY
        FOCSLPSAV/
        DATA BELL/7/
        RADIUS=1.54
        SFACT=1.25
        PY=PI(1.)
        RES=.005
        COV=1.1
        NE=20
        RO=1.52
        XZ=1.52
        YZ=1.52
        KROT = 0
        ALPHA=0.
C
C       GET THE ANGLE OF ROTATION FROM THE
        DATA FILE 'POINTS.DAT',
C       IF WE ARE IN THE PROCESS OF THE
        AUTOMATIC RUN.
C
        ANGLE = 0.0
        IF(ICHAIN.NE.-1) GO TO 2 !NOT CHAINED TO
        IF(PARMS(1).EQ.2)GO TO 3 !ZERO OUT ANGLE
        FOR SECOND TRY
        IF(PARMS(1).EQ.0)GO TO 2 !TABLE1 CALLED IT
        ALONE
        ANGLE = ROTATE !PICK UP ANGLE FROM DATA
        FILE VALUE GO TO 3
2       WRITE(7,810)
        READ(5,820) ANGLE
3       NSTEP=INT(ANGLE*5.4)
        CALL MOTOR(NSTEP,O)
        ANGLE=ANGLE*PY/180.
        ALPHA=ALPHA+ANGLE
        CALL TBLIN(THENOW,PHINOW)
        CALL START
5       IBFLG=0
        CALL INISHL
        IF (IBFLG.NE.0) GO TO 100
15      IQ(1)=30
        IQ(2)=30
        IQ(3)=30
        IQ(4)=30
        DO 10 I=1,4
            DO 20 J=1,30
                ANGLE=90.*(I-1)=J+30.
                ANGLE=ANGLE*PY/180.
                X=RADIUS*COS(ANGLE)
                Y=RADIUS*SIN(ANGLE)
                Y=Y*SFACT
                CALL VIDCAL(X,Y,WINDOW(J))
                IF WINDOW(J).GT.TH) IQ(I)=IQ(I)+1
20
10      CONTINUE
        XMOVE=(IQ(1)+IQ(4))-(IQ(2)+IQ(3))
        YMOVE=(IQ(1)+IQ(2))-(IQ(3)+IQ(4))
        XMOVE1=XMOVE*COS(ALPHA)-
        YMOVE*SIN(ALPHA)
        YMOVE1=XMOVE*SIN(ALPHA)+
        YMOVE*COS(ALPHA)
        DELPHI=-XMOVE1/1200.0
        DELTHE=(ATAN(YMOVE1/70000./
        SIN(PHINOW*PY/180.0)))*180.0/PY
        SUM=0.0
        DO 35 I=1,4
            SUM=SUM+IQ(I)
25      CONTINUE
        AVG=SUM/4.0
        SUM=0.0
        DO 35 I=1,4
            SUM=SUM+ABS(FLOAT(IQ(I))-AVG)
            WRITE(7,910) SUM,IQ(I)
            WRITE(6,910) SUM,IQ(I)
35      CONTINUE
        WRITE(7,200) BELL
        AVG1=SUM/3.6
        NSTEP=INT(AVG1*5.4)
        AVG1=AVG1*PY/180.
        WRITE(7,900) AVG1,SUM,AVG,NSTEP
        WRITE(6,900) AVG1,SUM,AVG,NSTEP
        KROT=KROT+1
        IF(KROT.GT.4) GOTO 70
        IF(SUM.LT.2.0) GOTO 99            !END..
        IF(IQ(2).EQ.IQ(1).OR.IQ(3).EQ.IQ(4)) GOTO 50
50      IF((IQ(2)-IQ(1))/(IQ(3)-IQ(4)).LT.0) GOTO 60
        IF((IQ(2)-IQ(3))/(IQ(1)-IQ(4)).LT.0) GOTO 80
        GOTO 70
60      IF(IQ(1).LT.IQ(2)) GOTO 61
        GOTO 62
61      WRITE (5,300)
        CALL MOTOR(NSTEP,O)
        ALPHA=ALPHA+AVG1
        GOTO 15
62      WRITE(5,310)
        CALL MOTOR(-NSTEP,O)
        ALPHA=ALPHA-AVG1
        GOTO 15
80      IF(IQ(2).IQ(3)) GOTO 81
        GOTO 82
81      WRITE(5,300)
        CALL MOTOR(NSTEP,O)
        ALPHA=ALPHA+AVG1
        GOTO 15
82      WRITE(5,310)
        CALL MOTOR(-NSTEP,O)
        ALPHA=ALPHA-AVG1
        GOTO 15
100     WRITE(5,800)IBFLG
        GOTO 5
70      KROT=0
        WRITE(5,240)(IQ(K),K=1,4)
        WRITE(5,920) PHINOW,DELPHI,THENOW,DELTHE
        WRITE(6,920) PHINOW,DELPHI,THENOW,DELTHE
        PHINOW=PHINOW+DELPHI
        THENOW=THENOW+DELTHE
        CALL TBLOUT(PHINOW,THENOW)
75      CALL MUX(8,INCH1,INCH2)
        IF((INCH.AND."400).EQ."400) GOTO 75
        GOTO 15
99      CALL CLOSE(6)
200     FORMAT('+',A1)
240     FORMAT(1X,4I5)
300     FORMAT('ROTATE CCW'/)
310     FORMAT('CW ROTATE'/)
800     FORMAT('TV DIAGNOSTIC MODE ',I3)
810     FORMAT('$ENTER ANGLE TO ROTATE:')
820     FORMAT(F10.2)
900     FORMAT(1X,3(F10.4,5X),3X,I5)
910     FORMAT(1X,F15.4,3X,I5)
920     FORMAT(1X,4F15.4/)
        END
```

I claim:

1. An automatic method for determining the geometric center of an element having a known peripheral shape of double symmetry comprising:
   selecting a trial center of an image of said element and defining a plurality of sectors radiating from said trial center and ecompassing all of at least a preselected portion of said element image;
   determining which ones of a locus of points overlie said image, said locus of points consisting of a number of spaced points along a line running through all of said sectors and having a predetermined relationship to said trial center;

comparing the number of points that overlie said image in each sector with the number of points overlying said image in each of the other sectors;

ascertaining whether said comparison is the same as a predefined comparison that exists when the trial center is the geometric center of said element; and if said comparison does not equal said predefined comparison, relatively moving said trial center with respect to said geometric center and repeating said selecting, determining, comparing and ascertaining steps.

2. The method as claimed in claim 1 wherein said locus of points is centered on and symmetrical about said trial center.

3. The method as claimed in claim 2 wherein said element is moved.

4. The method as claimed in claim 2 wherein said image is moved.

5. The method as claimed in claim 2 and further including calculating rotational and translational movements required for relatively moving said trial center.

6. The method as claimed in claim 5 and further including transforming said calculated movements into the coordinate system encompassing said element.

7. The method as claimed in claim 2 wherein said locus of points define a circle.

8. The method as claimed in claim 2 wherein four sectors are utilized.

9. The method as claimed in claim 1 wherein four sectors are utilized.

10. An automatic method for centering an element having a known shape of double symmetry comprising:

obtaining an image of at least a preselected portion of the element including the center thereof;

selecting a trial center and defining a plurality of sectors radiating from the trial center and encompassing all of said preselected image portion;

digitizing said preselected image portion into a matrix of points;

analyzing the digitized image along a line of spaced points having a predetermined relationship to said trial center to determine the number of said points that overlie said image in each of said predefined sectors;

determining if the number of said points per sector are unequal; and if so, relatively moving said trial center with respect to the element center and repeating the foregoing analyzing and determining steps.

11. The method as claimed in claim 10 wherein said analyzing step comprises assigning a first value to each point if said point overlies said image and a second value if said point does not overlie said image.

12. Apparatus for automatically determining the geometric center of an element having a known peripheral shape of double symmetry comprising:

means for obtaining a visual image of a selectable, predetermined portion of the element;

means for selecting a trial center of said visual image and for defining a plurality of sectors radiating from said trial center;

means for defining a line of spaced points running through said plurality of sectors and having a predetermined relationship to said trial center;

means for determining the number of said points overlying said image;

means for comparing the number of said overlying points in one sector with the number in each of the other sectors; and means for moving at least one of said element and said image obtaining means relative to the other in response to said comparison.

13. Apparatus as claimed in claim 12 wherein said obtaining means includes a television camera, said apparatus further comprising monitor means for displaying the visual image as a matrix of pixels, each pixel corresponding to a point.

14. Apparatus as claimed in claim 13 wherein said obtaining means further includes a microscope and an optical image moving means for optically coupling said microscope and said television camera.

15. Apparatus as claimed in claim 14 wherein said comparing means includes means for causing said moving means to reposition at least one of the elements and said image obtaining means in response to said comparison;

and wherein said moving means includes a means for supporting said microscope, said optical image moving means, and said camera, and includes a servocontrol means under control of said causing means for moving said supporting means.

16. Apparatus as claimed in claim 15 wherein said moving means further includes a further means for supporting said element and a servocontrol means under control of said causing means for moving said further supporting means.

17. Apparatus as claimed in claim 12 wherein said comparing means comprises a programmed general purpose digital computer.

* * * * *